Figure 1:
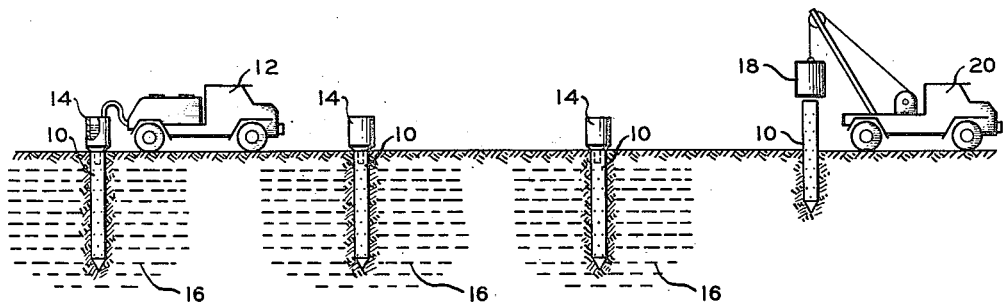

Dec. 17, 1957  R. G. PIETY  2,816,618
SEISMIC WAVE GENERATION BY THE WEIGHT-DROPPING TECHNIQUE
Filed Jan. 17, 1955  2 Sheets-Sheet 1

INVENTOR.
R.G. PIETY
BY *Hudson & Young*
ATTORNEYS

Dec. 17, 1957 R. G. PIETY 2,816,618
SEISMIC WAVE GENERATION BY THE WEIGHT-DROPPING TECHNIQUE
Filed Jan. 17, 1955 2 Sheets-Sheet 2

INVENTOR.
R. G. PIETY
BY *Hudson & Young*
ATTORNEYS

United States Patent Office 2,816,618
Patented Dec. 17, 1957

2,816,618

SEISMIC WAVE GENERATION BY THE WEIGHT-DROPPING TECHNIQUE

Raymond G. Piety, Bartlesville, Okla., assignor to Phillips Petroleum Company, a corporation of Delaware Application January 17, 1955, Serial No. 482,135

10 Claims. (Cl. 181—.5)

This invention relates to a method or process for improved seismic wave generation.

Seismic exploration has long depended on the use of shot holes and explosives in combination with geophones and recording equipment. Recently a new technique has been introduced to this field involving the utilization of weight-dropping to produce seismic waves which were heretofore produced by an explosion in shot holes bored into the upper layers of the earth in the location to be explored. The weight-dropping technique comprises raising a heavy steel or iron weight a substantial distance above the ground, releasing the weight so that it falls by gravity onto the surface of the ground, and recording the seismic waves emanating from the weight-dropping spot and reflected from sub-surface strata by means of conventional seismometers and other recording equipment associated therewith.

In one well-known application of the weight-dropping technique a 3-ton steel block, 5 feet long and 3 feet wide, is dropped a distance of about 9½ feet so as to freely fall onto a selected weight-dropping spot. The weight is raised by a wire line hoist which is powered by an engine mounted behind the cab of a weight-dropping truck. The weight is released by electronic controls located in the recording truck, the same being in constant communication with the weight truck. The recording device records on magnetic sound tracks or by other conventional methods a series of records made from a separate impact on the ground and a number of impacts made at different locations. A portion of the energy which is directed downwardly by the weight-dropping impact is reflected back to the surface and the integrating recorder integrates these small pulses and amplifies them for recording. Additional details of the weight-dropping technique in seismic exploration are well known in the art. The present invention is concerned particularly with the improvements in the above-described weight-dropping technique.

One of the principal objects of the invention is to provide an improved method of seismic wave generation by weight-dropping. Another object is to provide an improved method of seismic wave generation by weight-dropping which increases the wave energy emanating from any given weight drop. Another object is to provide an improvement in weight-dropping technique which renders the same effective in areas of loose top soil and/or unconsolidated surface layers. A further object of the invention is to provide an improved method of seismic wave generation by weight-dropping which is more effective in areas in which a rocky formation is present close to the surface of the earth. Other objects of the invention will become apparent from a consideration of the accompanying disclosure.

I have found that the use of a plurality of weight drops on a given weight-dropping spot greatly increases the effectiveness of the weight-dropping technique by increasing the amplitude of the down-going waves from the weight-dropping spot. When a weight is dropped on unconsolidated or loose sand or soil to generate seismic waves, much of the energy is absorbed by plastic deformation. The low top surface velocity keeps the acoustic impedance low compared to the weight material. In addition, the ratio of surface wave to compressional wave amplitude is high. These factors are improved by wetting the soil before weight-dropping and/or by dropping the weight a number of times before making the recording of reflected wave energy.

Test data obtained in the Burbank, Oklahoma field show that the velocity of sound waves in the dry surface sand is about 1000 feet per second while the sound velocity in the same sand after wetting is approximately 5600 feet per second. By wetting the surface layer so as to partially saturate the same, better sound transmission and seismic waves of greater amplitude are produced in the soaked area by the weight-dropping technique.

Water is by far the most practical and economical liquid to use in soaking the soil in the desired area but other liquids, such as oil, may be utilized where more accessible and in instances where the cost is not an important factor. Prepared salt solutions or natural salt solutions from underground sources or from surface stream may be utilized for soaking purposes. Generally, the denser the liquid the more effective it is in wetting technique. Salts which may be used include alkali and alkaline earth metal salts such as sodium and magnesium chlorides and sulfates, etc. The water or other liquid is introduced to the surface layer at the weight-dropping spot by any suitable method which soaks the soil or rock formation to a suitable depth such as at least 2 or 3 feet. In readily permeable soil or rock, slow pouring of the water onto the surface at the weight-dropping spot is sufficient. In instances where the surface layer is less permeable, as well as in instances in which it is desired to introduce the water rapidly, a hole is drilled into the surface layer to a depth of several feet and water is poured into the hole with replenishment as the water soaks into the formation. In some instances it is advantageous to drive a perforated pipe into the ground until considerable resistance to driving is encountered, and after driving of the pipe to the desired depth, introduce water thereto by means of a funnel and/or hose until the desired amount of soaking or partial saturation has been effected. It is also feasible to attach a hose from a water truck, or other available water supply, to the pipe extending into the ground and forcing water into the formation under pressure.

In one embodiment of the invention a weight is dropped on the soaked weight-dropping spot several times so as to compact the partially saturated formation and thereby additionally improve the amplitude of the seismic waves generated by the final weight-drop from which the recordings are made. In this manner the improved effects of both the wet earth and the compaction from weight-dropping are obtained.

In many areas, and particularly in the Southwestern area of the United States such as in west Texas, there is a limestone formation very close to the surface of the earth and this is covered by only a few inches to a few feet of loose top soil. It has been found that the soaking of the top soil and/or the compaction thereof by multiple weight-dropping effects a substantial improvement in the weight-dropping technique by increasing the amplitude of compressional waves emanating from the weight-dropping spot. It has also been found that a geratly improved effect on amplification of seismic wave energy is obtained by clearing off the thin top soil at the weight-dropping spot and dropping the weight on the limestone formation. It is surprising to find that even where the dropping weight is dropped directly on the limestone formation the multiple weight-dropping technique of the invention appreciably improves the weight-dropping method, in that the amplitude of compressional waves going downwardly from the weight-dropping spot is increased with each drop for several drops.

Figure 2:
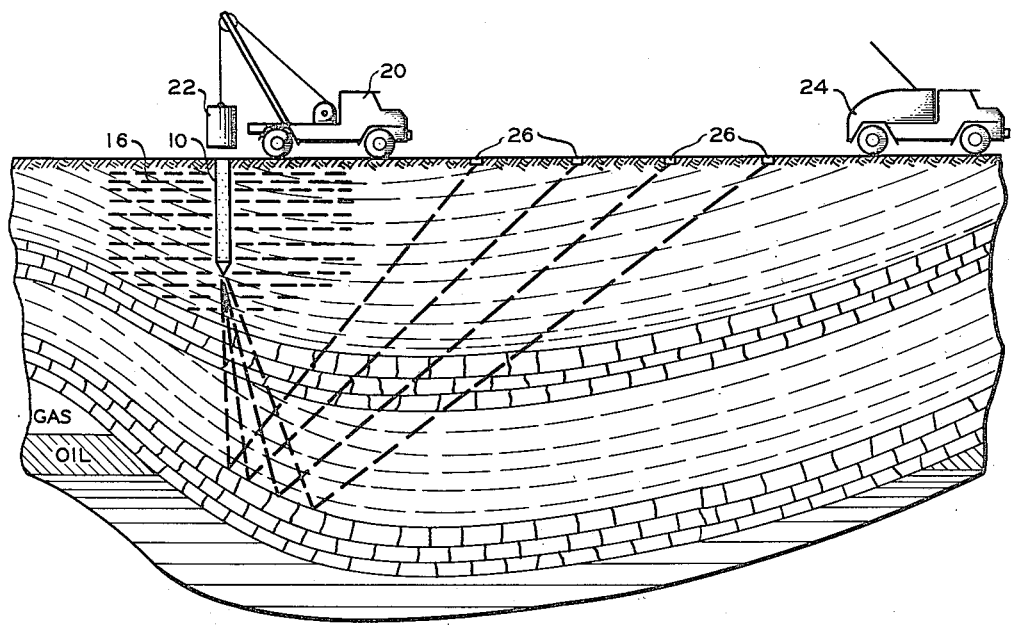
Figure 3:
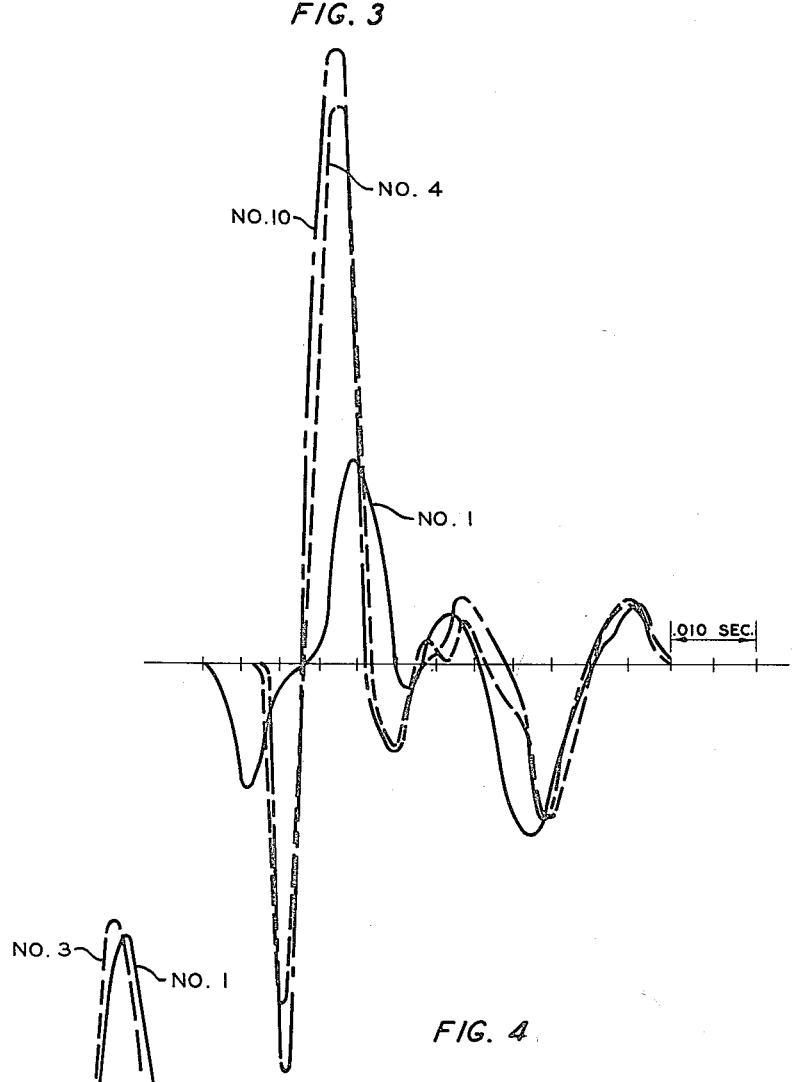
Figure 4:
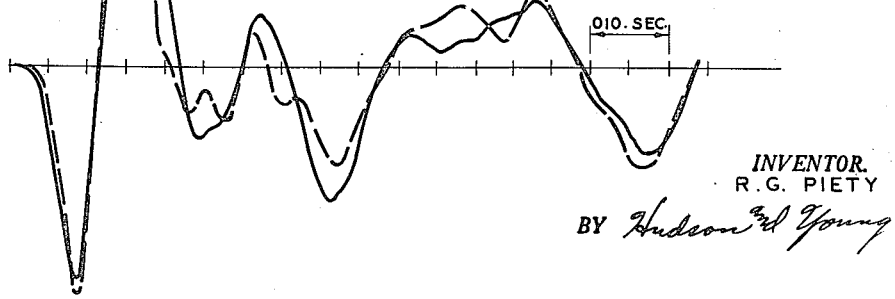

More complete understanding of the invention may be had from a consideration of the accompanying drawing of which Figure 1 is a schematic view of one embodiment of the soaking technique utilizing perforate pipes; Figure 2 is a schematic view of weight-dropping and recording technique in accordance with the invention; Figure 3 is a trace produced by a recording oscillograph showing the character and particularly the amplitude of down-going wavelets from three different weight-drops on the same spot at a location in Reagan County, Texas with the top soil removed; and Figure 4 is a trace showing similar wave characteristics from down-going wavelets from two different weight drops on the top soil at the location of the weight-dropping of Figure 3.

Referring to Figure 1, perforated pipes 10 are driven into the ground a distance of several feet and water from a truck 12 is introduced into a funnel 14 inserted in the upper end of one of pipes 10 so as to soak an area 16 surrounding the pipe. Pipes 10 may be driven into the ground by a dropping weight or other suitable heavy weight 18 operated by a weight truck 20. Sufficient water is introduced to the weight-dropping area to thoroughly wet the soil without effecting complete saturation thereof which would make the surface layer soggy and too plastic to respond effectively to the weight-dropping technique. The optimum amount of water to introduce to the soil in the weight-dropping spot can readily be determined by simple experiment. If too much is added, a short drying period will restore the soil to a condition which is suitable for optimum weight-dropping results.

Figure 2 shows truck 20 engaged in the weight-dropping step which is preferably repeated a number of times in order to increase the effectiveness of the final and recorded weight-drop. Weight 22 may be in the form of a prism or a cylinder or any other suitable shape. The use of a weight having a generally flat bottom which hangs so that the bottom is parallel with the earth's surface (horizontal) is preferred because it is more effective. The final weight-drop is directly or indirectly controlled from recorder truck 24. The impact of weight 22 on the dropping spot generates a wave which travels downwardly and a portion of the wave energy is reflected from subsurface strata to seismometers 26 positioned along the earth's surface at suitable predetermined locations and these instruments are connected by conventional means with the recording truck.

The size of the weight to be used in weight-dropping depends upon a number of factors such as the height of the drop, the shape and density of the weight, the stratigraphy of the area in which the exploration is to be made, etc. In some applications a weight of 500 pounds or less may be effective, while in others a weight of 3000 pounds or more is more suitable. In the event the weight selected for a particular application is not sufficiently effective, a larger weight can be selected or a greater drop can be used.

The down-going wavelets shown in Figure 3 illustrate the improvement in the weight-dropping technique obtained by multiple weight-drops on the same weight-dropping spot. Wave Number 1 was recorded from the first weight-drop on an uncovered limestone formation in west Texas using an 1800 pound weight, while waves Numbers 4 and 10 were recorded from the 4th and 10th weight-drops, respectively, on the same weight-dropping spot. The down-going wavelets were picked up by geophones positioned in a bore hole at 500 feet below the surface. The amplitude of these waves is in the ratio of 1.0 to 2.7 to 3.0 indicating a tremendous advantage in multiple weight-drops even on a hard stone formation.

Waves 1 and 3 of Figure 4 were obtained from the 1st and 3rd weight-drops, respectively, at the same location before the 6 to 8 inches of loose soil covering was removed from the limestone formation. In neither of the weight-dropping tests made to obtain the data of Figures 3 and 4 was there any soaking of the soil or limestone formation. Numerous weight dropping tests were made in various areas of the Southwest and results similar to those shown in Figures 3 and 4 were obtained.

The foregoing disclosure indicates clearly that the use of multiple weight-dropping technique and soil-wetting technique, alone, and in combination substantially enhance the effectiveness of the weight-dropping technique in seismic exploration.

Certain modifications of the invention will become apparent to those skilled in the art and the illustrative details disclosed are not to be construed as imposing unnecessary limitations on the invention.

I claim:

1. A method of seismic wave generation by weight dropping adapted to seismic exploration in an area in which surface layers are unconsolidated, which comprises partially saturating said surface layer with water to a substantial depth where the weight is to be dropped; dropping a weight at the point of wetting so as to generate a seismic signal; and recording reflected waves from a substratum.

2. The method of claim 1 including introducing water to the area to be wetted thru a borehole extending into the ground several feet.

3. The method of claim 1 wherein a perforate pipe is driven into the ground several feet and water is introduced thru said pipe.

4. The process of claim 1 including compacting the earth at the dropping spot by dropping a heavy weight having a flat bottom surface from a substantial height of several feet several times prior to the recording step.

5. The method of claim 1 wherein the water includes a water soluble wetting agent.

6. A method of seismic wave generation by weight dropping adapted to seismic exploration in an area in which surface layers are compactable, which comprises compacting a weight-dropping spot in said area by dropping a dense heavy weight on said spot a plurality of times; wetting said spot to at least partially saturate same to a depth of at least several feet; thereafter dropping said weight on said spot so as to generate a seismic wave; and recording reflected waves from a substratum.

7. The method of claim 6 wherein said wetting step precedes several weight drops.

8. The method of claim 6 including the steps of wetting said spot with water containing a wetting agent to partially saturate same to a depth of several feet before the final weight dropping step.

9. A method of seismic wave generation by weight-dropping adapted to seismic exploration in an area in which a subsurface rocky formation is covered by a relatively thin unconsolidated layer which comprises removing said layer from a selected weight-dropping spot; dropping a heavy dense weight on said spot; wetting the rocky formation at the weight-dropping spot to a substantial depth before the weight-dropping just preceding the recording; and recording reflected waves from a substratum.

10. The process of claim 9 including the step of making said recording after several weight droppings on said spot.

References Cited in the file of this patent

UNITED STATES PATENTS 2,364,209    Green _____ Dec. 5, 1944

OTHER REFERENCES

Jakosky: "Exploration Geophysics," published by Trija Publishing Co., Los Angeles, California, 1950, page 856.

"McCollum's Geograph," World Oil Magazine, April 1954, volume 138, No. 5, page 46.